US012712901B2

(12) United States Patent
Gottlieb et al.

(10) Patent No.: US 12,712,901 B2
(45) Date of Patent: Aug. 18, 2026

(54) SYSTEMS AND METHODS FOR CONTROLLING COMPUTING SYSTEMS ASSOCIATED WITH NETWORK OPERATIONS

(71) Applicant: Stripe, LLC, South San Francisco, CA (US)

(72) Inventors: Michael Gottlieb, South San Francisco, CA (US); Alisa Noll, South San Francisco, CA (US); Jonathan Konrad Pedde, South San Francisco, CA (US); Panayiotis Thomakos, South San Francisco, CA (US); David Brace, South San Francisco, CA (US); Travis Rahe, South San Francisco, CA (US); Daniel Williams, South San Francisco, CA (US)

(73) Assignee: Stripe, LLC, South San Francisco, CA (US)

( * ) Notice: Subject to any disclaimer, the term of this patent is extended or adjusted under 35 U.S.C. 154(b) by 4 days.

(21) Appl. No.: 18/758,989

(22) Filed: Jun. 28, 2024

(65) Prior Publication Data

US 2026/0006051 A1 Jan. 1, 2026

(51) Int. Cl.
*H04L 9/40* (2022.01)

(52) U.S. Cl.
CPC ...... *H04L 63/1425* (2013.01); *H04L 63/1416* (2013.01)

(58) Field of Classification Search
CPC . H04L 63/1425; H04L 63/1416; H04L 63/14; H04L 63/1408
USPC .......................................................... 726/23
See application file for complete search history.

(56) References Cited

U.S. PATENT DOCUMENTS

2006/0282660 A1* 12/2006 Varghese .............. G07F 7/1083 713/155
2014/0019340 A1* 1/2014 Ruder ................ G06Q 20/4016 705/39
2020/0076846 A1* 3/2020 Pandian .............. H04L 63/1425
2022/0201010 A1* 6/2022 Tarsauliya .............. G06F 21/44
2022/0253856 A1* 8/2022 Wong ................. G06Q 20/4016
2022/0385676 A1* 12/2022 Chen Kaidi .......... G06F 21/554
2023/0281300 A1* 9/2023 Prochazka .............. G06F 21/55 726/23

(Continued)

*Primary Examiner* — Kaylee J Huang
(74) *Attorney, Agent, or Firm* — Foley & Lardner LLP

(57) ABSTRACT

Presented herein are systems and methods of evaluating network operations associated with computing systems. A server may receive, from a computing system, an electronic request to execute a first network operation using a plurality of attributes provided by an end user device to the computing system. The first network operation may be initiated via the end user device. The server may retrieve (i) a digital fingerprint associated with an identity of the computing system and (ii) a plurality of network operation metrics associated with the computing system. The server may execute, using the digital fingerprint and the plurality of network operation metrics, a machine learning (ML) model to generate a likelihood of fraud caused by the computing system. The server may, in response to the likelihood of fraud satisfying a threshold, execute a second network operation using the plurality of attributes, instead of executing the first network operation.

20 Claims, 11 Drawing Sheets

(56) References Cited

U.S. PATENT DOCUMENTS

| | | | | |
|---|---|---|---|---|
| 2024/0121248 | A1* | 4/2024 | Ferreira | H04L 63/1416 |
| 2025/0106255 | A1* | 3/2025 | Clark | H04L 63/166 |

* cited by examiner

500

Overview Connected Accounts Accounts to review

+ Create

All accounts 1,218

Restricted 939

Restricted soon 8

Pending 24

Enabled 73

Status Volume Balance More filters

Export

This is account might be fraudulent.

| | Status | Balance | Volume | Type | Created | |
|---|---|---|---|---|---|---|
| ⊘ John Smith | Restricted | $0.00 | $10,500.05 | Express | Jan 24 | .... |
| testaccount@email.com | Restricted soon | $0.00 | $0.00 | Standard | Jan 24 | .... |
| iamafrauduster@email.com | Enabled | $0.00 | $0.00 | Custom | Jan 21 | .... |
| ⊘ fraudsteraccount@email.com | Restricted soon | $408.10 | $1,245.65 | Custom | Jan 21 | .... |
| Joe Schmoe | Enabled | $102.05 | $3,456.12 | Custom | Jan 20 | .... |
| Jane Doe | Pending | $0.00 | $0.00 | Custom | Jan 14 | .... |
| Freddo | Pending | $0.00 | $0.00 | Custom | Jan 14 | .... |
| Jane Smith | Pending | $0.00 | $0.00 | Custom | Jan 14 | .... |
| Johnie Bloggs | Enabled | $0.00 | $0.00 | Custom | Jan 7 | .... |
| A.N. Other | Enabled | $0.00 | $0.00 | Custom | Jan 7 | .... |
| Richard Roe | Enabled | $15.56 | $1,234.56 | Custom | Jan 6 | .... |
| Joe Bloggs | Enabled | $0.00 | $0.00 | Custom | Jan 5 | .... |
| Foo Bar | Enabled | $0.00 | $0.00 | Custom | Jan 5 | .... |

Viewing 20 of 1,218 results

Previous Next

SYSTEMS AND METHODS FOR CONTROLLING COMPUTING SYSTEMS ASSOCIATED WITH NETWORK OPERATIONS

TECHNICAL FIELD

The present application is generally related to evaluating and controlling network operations associated with computing systems in networked environments.

BACKGROUND

In a computer networked environment, a computing system may transmit a request to access resources on a server. The request may include a number of parameters for a function to be performed by the server using the resources. The resources may be protected and may include data only accessible to authorized computing systems. As such, upon receipt, the server may check the parameters to determine whether the request is a malicious, fraudulent, or otherwise unauthorized attempt to access the resources on the server. Certain parameters and information about the request may be correlated with unauthorized attempts at accessing the server's resources. If the request does not pass the check, the server may reject the request as unauthorized, refrain from carrying out the function, and block access to the resources. While this framework is able to prevent certain requests from accessing the request, the approach may entail checking every request, resulting in significant consumption of computing resources when processing the request. Furthermore, this approach may be unable to distinguish between malicious and non-malicious entities transmitting authorized or unauthorized requests to the server.

SUMMARY

Presented herein are systems and methods for evaluating and controlling network operations associated with computing systems in network environments. In a networked environment, a computing system may interface or communicate with a server, using data provided by an end-user device. In particular, the computing system may transmit a request to execute a network operation using attributes provided by an end-user device. The computing system in turn may generate a response to send to the end-user device to indicate completion of the network operation requested by the server on behalf of the end-user device.

In certain instances, the request may appear to be an authorized attempt to access resources of the server (e.g., by requesting a network operation) lacking any indication from the attributes or other information that the request is unauthorized or unauthenticated. For example, the request may mask the identity of the malicious or unauthenticated entity associated with the computing system, with the identity of an authenticated entity. As a result, when performing checks on the request itself, the server may determine that the request is authorized or valid and may pass through the request for additional processing to carry out the network operation. The computing system, on the other hand, may be associated with a malicious, fraudulent, or otherwise unauthenticated entity attempting to gain access and have the server carry out the network operation (e.g., conduct or otherwise facilitate a transaction). While the server may be able to determine whether the request is malicious, fraudulent, or unauthenticated, the server may be unable to identify that the computing system is malicious, fraudulent, or otherwise unauthenticated to have network operations be performed on the server. As a result, the computing systems associated with such entities may gain access to server resources and carry out network operations.

To address these and other technical issues, the server may execute a machine learning model to determine a likelihood of fraud caused by the computing system (or the entity associated with the computing system) and use the likelihood to control network operations and communications from the computing system. To that end, when the request for network operation is received, the server may identify a digital fingerprint of an identity of the computing system. The digital fingerprint may be derived from information associated with the identity of the computing system. The information may include, for example, an account identifier, an email address, contact information, name of entity, a web address associated with the computing system, or cookie-related data (e.g., history of the computing system). In addition, the server may retrieve metrics associated with prior network operations of the computing system. The network operation metrics may include, for instance, a rate of rejections, a rate of reversal requests, or a rate of disputes, among others, associated with prior requests transmitted by the computing system. The server may also obtain risk factors as identified by instrument services monitoring activities of the computing system. The risk factors may include any indication to be used to determine the likelihood of fraud, such as a location of the computing system, a protocol used in communications with the computing system, and notifications of fraud from other services (e.g., from third-party services), among others.

With the identification, the server may execute a machine learning model using the digital fingerprint of the identity, the network operation metrics, and the risk factors, among others. The machine learning model may have been trained using sample data including digital fingerprints, network operation metrics, and risk factors from other computing systems, together with a label indicating whether the computing system in the sample data is fraudulent or non-fraudulent. The machine learning model may have a set of weights in accordance with a model architecture, and upon learning from the training data, the set of weights may be trained to detect latent features correlated with fraudulent (or non-fraudulent) computing systems. By executing, the server may generate a likelihood of fraud caused by the computing system. The execution of the machine learning model may be independent of the determination of whether the request for the network operation itself is unauthorized. The scores determined as to whether the request is unauthorized may indicate a degree of likelihood of whether the request itself is unauthorized. The likelihood of fraud, on the other hand, may measure a probability that the computing system itself is malicious, unauthorized, or otherwise fraudulent.

Based on the likelihood, the server may select mitigation actions to carry out on the computing system. To select which action to take, the server may use the likelihood to identify a classification of the computing system from a set of classifications. Each classification may indicate a level of severity for fraudulence and may correspond to a range of values (or thresholds) for the likelihood of fraud. For example, a relatively low likelihood (e.g., less than 0.3) may indicate a low severity for fraudulence, whereas a relatively high likelihood (e.g., greater than 0.8) may indicate an extremely high severity for fraudulence. Each classification may be associated with a mitigation action to be performed on the network operations from the computing system when categorized into the classification. For instance, for a high level of severity (e.g., greater than 0.8), the classification may specify that the request is to be automatically rejected. For a moderate level of severity (e.g., between 0.5 to 0.8), the classification may specify the generation of an alert for the administrator of the server and additional inspection of the request.

In accordance with the classification, the server may select the mitigation action to perform on the network operations. For instance, when the likelihood of fraud exceeds a threshold for a classification for a high level of severity, the server may execute another network operation using the attributes of the request. The other network operation may include routing the attributes of the request for further inspection. In addition, the server may generate a data record to add to subsequent requests from the computing system to indicate that the subsequent request is to undergo additional inspection. With the record, the mitigation action may be applied by the server to subsequent requests from the computing system, without having to re-run the machine learning each time on each request. In contrast, when the likelihood of fraud does not exceed the threshold, the server may permit the request network operation to be performed on the server using the attributes. Additionally, the server may provide a dashboard interface identifying the computing systems communicating requests for network operations with the server. The dashboard interface may be presented to a user, such as an administrator for the server or another party accessing the server for the network operations. The dashboard interface may, for example, show a list of computing systems by classifications determined based on likelihoods of fraud. Using the dashboard, the user may investigate accounts associated with computing systems with high likelihoods of fraud and may select the mitigation action to perform on a given computing system.

In this manner, the server may distinguish between fraudulent and non-fraudulent computing systems to control network operations in requests from the computing systems, even if the requests themselves are determined to be valid or authenticated. This way, the server may provide for enhanced and improved security to processes and resources accessible through the server, thereby reducing chances of breach of data security policies or unauthorized access. The dashboard interface provided by the server may also provide additional information to administrators at safeguarding data and resources, thereby further enhancing security from blocking malicious entities access to the server. Furthermore, rather than processing and evaluating each individual request, the server may be able to control network operations requested by computing systems on an entity-by-entity basis. The ability to control network operations on a computing system basis may also significantly save computing resources that would have otherwise been consumed in processing individual requests.

Aspects of the present disclosure may be directed to systems and methods of evaluating network operations associated with computing systems. A server having one or more processors coupled with memory may receive, from a computing system of a plurality of computing systems, an electronic request to execute a first network operation using a plurality of attributes provided by an end user device to the computing system. The first network operation may be initiated via the end user device. The server may retrieve (i) a digital fingerprint associated with an identity of the computing system and (ii) a plurality of network operation metrics associated with the computing system. The server may execute, using the digital fingerprint and the plurality of network operation metrics, a machine learning (ML) model to generate a likelihood of fraud caused by the computing system. The server may, in response to the likelihood of fraud satisfying a threshold: execute a second network operation using the plurality of attributes, instead of executing the first network operation; and generate a data record to add to a subsequent electronic request from the computing system to indicate a requisition for inspection.

In one embodiment, the server may determine, from a plurality of classifications, a classification of the computing system based on the likelihood. The server may select, from a plurality of network operations, the second network operation based on the classification of the computing system. In another embodiment, the plurality of network operations may include at least one of: (i) a rejection of the subsequent electronic request, (ii) a routing of the subsequent electronic request for inspection, or (iii) a generation of an alert to indicate the computing system as cause of fraudulence.

In yet another embodiment, the server may generate an output, using an association between the computing system and at least one of: (i) the digital fingerprint, (ii) the plurality of network operation metrics, or (iii) the likelihood of fraud caused by the computing system. The server may transmit the output for presentation via a user interface having a plurality of user interface elements. In yet another embodiment, the server may select a template from a plurality of templates based on the likelihood of fraud. Each of the plurality of templates may define generation of codes to characterize the computing system. The server may generate the output in accordance with the template.

In yet another embodiment, the server may receive a plurality of risk factors associated with the computing system from an instrumentation service. The service may execute the ML model using the plurality of risk factors from the instrumentation service. In yet another embodiment, the server may execute, using a second digital fingerprint and a second plurality of network operation metrics associated with a second computing system of the plurality of computing systems, the ML model to generate a second likelihood of fraud caused by the second computing system. The server may, in response to the likelihood of fraud not satisfying a threshold, execute a third network operation using a second plurality of attributes in accordance with a second electronic request from the second computing system.

In yet another embodiment, the server may control communications including subsequent electronic requests for network operations from the computing system. In yet another embodiment, the server may generate a plurality of constituent scores corresponding to a plurality of fraud indicators for the computing system. In yet another embodiment, the plurality of digital fingerprints may include at least one of: (i) an account identifier associated with the computing system, (ii) an identifier corresponding to an entity associated with the computing system, (iii) contact information for the entity, (iv) an electronic mail address associated with the entity, or (v) an address corresponding to the computing system.

Aspects of the present disclosure may be directed to systems and methods of training machine learning (ML) models to determine likelihoods of fraud in network operations caused by computing systems. A server having one or more processors coupled with memory may generate training data to include (i) a digital fingerprint associated with an identity of a computing system of a plurality of computing systems and (ii) a plurality of network operation metrics associated with the computing system. The computing system may provide a request to execute a first network operation using a plurality of attributes provided by an end user device to the computing system. The server may label the training data to indicate whether fraudulence is caused by the computing system. The server may execute, using the digital fingerprint and the plurality of network operations of the training data, a ML model having a plurality of weights to generate a likelihood of fraud caused by the computing system. The server may compare the likelihood of fraud generated by the ML model with labeled training data to determine an error metric in accordance with a loss function. The server may update at least one of the plurality of weights of the ML model using the error metric.

In one embodiment, the server may retrieve (i) a second digital fingerprint associated with an identity of a second computing system of the plurality of computing systems and (ii) a second plurality of network operation metrics associated with the second computing system. The server may execute using the second digital fingerprint and the second plurality of network operation metrics, the ML model to generate a second likelihood of fraud caused by the second computing system. In another embodiment, the server may generate an alert to indicate that fraudulence is caused by the second computing system, responsive to the second likelihood of fraud exceeding a threshold. The server may transmit the alert to indicate that fraudulence is caused by the second computing system for presentation via the user interface.

In yet another embodiment, the server may select, from a plurality of network operations, one or more network operations for the second computing system, responsive to the second likelihood of fraud exceeding a threshold. The server may execute the one or more network operations of the plurality of network operations to control communications including subsequent requests for network operations from the second computing system. In yet another embodiment, the server may refrain from generation of an alert to indicate that fraudulence is caused by the second computing system, responsive to the second likelihood of fraud not exceeding a threshold.

In yet another embodiment, the server may receive, via a user interface, feedback data indicating whether fraudulence is caused by the computing system. The server may compare the likelihood generated by the ML model with the feedback data to generate a second error metric. The server may update at least one of the plurality of weights of the ML model using the second error metric.

In yet another embodiment, the server may add, to the training data, a plurality of risk factors associated with the computing system from an instrumentation service. The server may execute the ML model using the plurality of risk factors from the instrumentation service. In yet another embodiment, the server may determine, from a plurality of classifications, a classification of the computing system based on the likelihood. The server may compare the classification with the label to determine the error metric.

In yet another embodiment, the server may control communications including subsequent requests for network operations from the computing system. In yet another embodiment, the server may generate a plurality of constituent scores corresponding to a plurality of fraud indicators for the computing system. In yet another embodiment, the plurality of digital fingerprints may include at least one of: (i) an account identifier associated with the computing system, (ii) an identifier corresponding to an entity associated with the computing system, (iii) contact information for the entity, (iv) an electronic mail address associated with the entity, or (v) an address corresponding to the computing system.

It is to be understood that both the foregoing general description and the following detailed description are explanatory and are intended to provide further explanation of the invention as claimed.

BRIEF DESCRIPTION OF THE DRAWINGS

The accompanying drawings constitute a part of this specification and illustrate embodiments of the subject matter disclosed herein.

FIG. 5A depicts a screenshot of a user interface for presenting a list of accounts for computing systems and indications of status based on likelihoods of fraud, in accordance with an illustrative embodiment.

DETAILED DESCRIPTION

Figure 1:
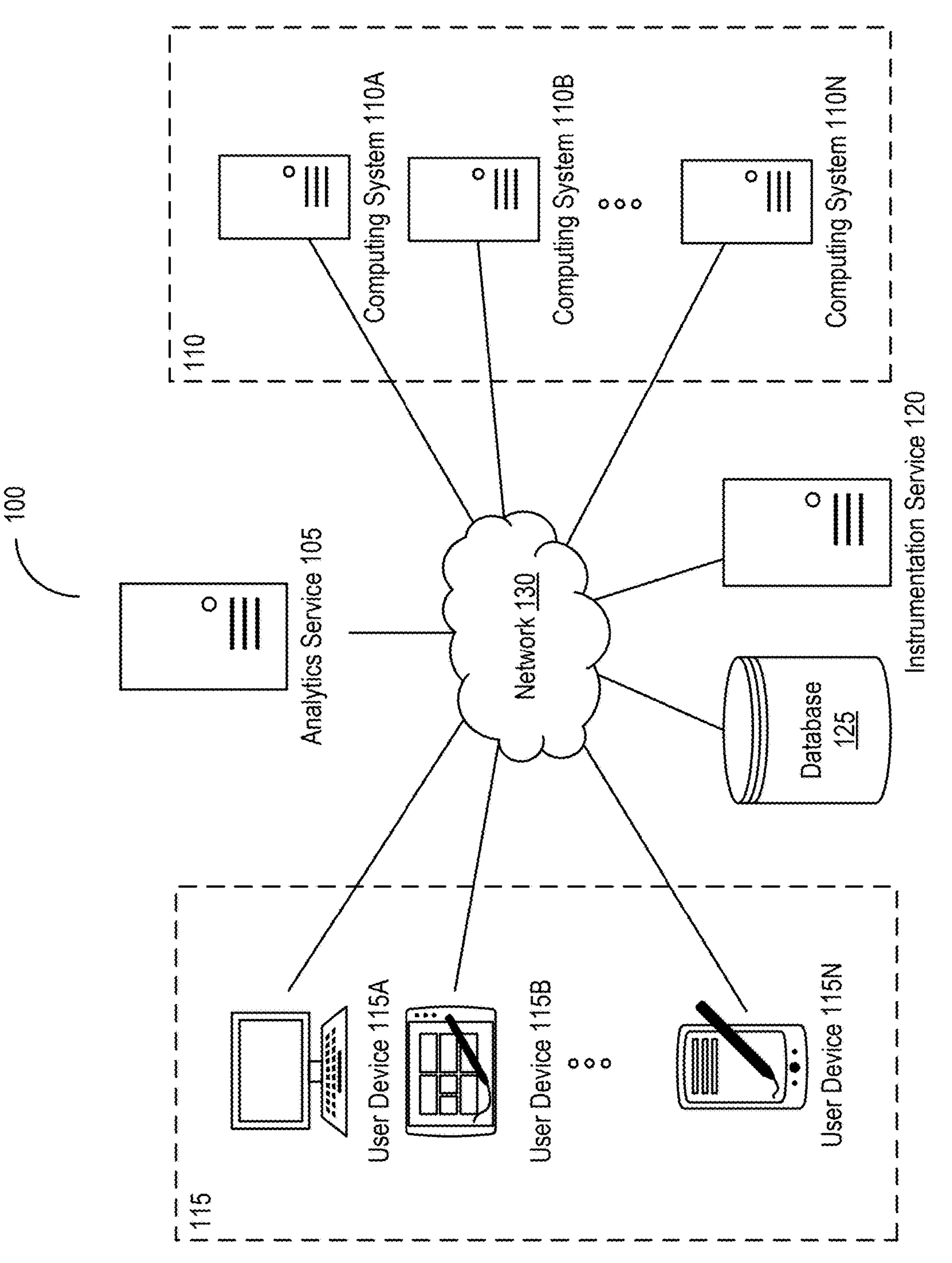
FIG. 1 depicts a block diagram of a system for evaluating and controlling network operations associated with computing systems in network environments, in accordance with an illustrative embodiment.

Reference will now be made to the illustrative embodiments illustrated in the drawings, and specific language will be used here to describe the same. Nevertheless, it will be understood that no limitation of the scope of the claims or this disclosure is intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is described here in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Presented herein are systems and methods for evaluating and controlling network operations associated with computing systems in network environments. When a request for network operation is received, the server may identify a digital fingerprint of an identity of a computing system. In addition, the server may retrieve metrics associated with prior network operations of the computing system. With the identification, the server may execute a machine learning model using the digital fingerprint of the identity and the network operation metrics to generate a likelihood of fraud caused by the computing system. Based on the likelihood, the server may select mitigation actions to carry out on the computing system. In accordance with the classification, the server may select the mitigation action to perform on the network operations. In addition, the server may provide a dashboard interface identifying the computing systems communicating requests for network operations with the server. In this manner, the server may distinguish between fraudulent and non-fraudulent computing systems to control network operations in requests from the computing systems, even if the requests themselves are determined to be valid or authenticated.

FIG. 1 depicts a block diagram of a system 100 for evaluating and controlling network operations associated with computing systems in network environments. In brief overview, the system 100 may include at least one analytics service 105, a set of computing systems 110A-N (hereinafter generally referred to as computing systems 110), a set of user devices 115A-N (hereinafter generally referred to as user devices 115), at least one instrumentation service 120, and at least one database 125, among others, communicatively coupled with one another via at least one network 130. Each of the components described in FIG. 1 may be implemented or performed using any one or more of the hardware or combination of software and hardware components detailed herein.

The analytics service 105 (sometimes herein referred to as a server or service) may be any computing device comprising of a processor and non-transitory, machine-readable storage capable of executing the various tasks and processes described herein. The analytics service 105 may be associated with an entity (e.g., a system administrator) evaluating or assessing whether fraudulence is caused by a given computing system 110 in communicating with user devices 115. In some embodiments, the analytics service 105 may be associated with a payments processor entity, handling transaction requests received from entities associated with the computing system 110. For a given computing system 110, the analytics service 105 may identify digital fingerprint of an identity and metrics of previous network operations as well as data about the computing system 110 from the instrumentation service 120. With the identification, the analytics service 105 may execute a machine learning (ML) model to determine a fraud score indicating a likelihood of fraud caused by the computing system 110. Based on the score, the analytics service 105 may perform any mitigation actions to address the potential for fraud caused by the computing system 110. In some embodiments, the analytics service 105 may be integrated with other services to facilitate the determination of the fraud score. For example, the analytics service 105 may be part of a risk management system to determine merchant risk scoring for merchant entities (e.g., associated with computing systems 110).

The analytics service 105 may utilize features described herein to retrieve data and generate/display results, such as via a platform displayed on various devices. The analytics service 105 may generate and display a dashboard interface platform (e.g., an information generation platform that is sometimes referred to as a platform) on any device discussed herein. For instance, the platform may include one or more graphical user interfaces (GUIs) displayed on an administrator device. An example of the platform generated and hosted by the analytics service 105 may be a web-based application or a website configured to be displayed on various electronic devices, such as mobile devices, tablets, personal computers, and the like. The platform may include various input elements configured to receive information requests from any of the users and display results in response to such information requests during the execution of the methods discussed herein. The analytics service 105 may iteratively execute the applications to process and generate responses to the information requests.

The analytics service 105 may employ various processors, such as a central processing unit (CPU) and graphics processing unit (GPU), among others. Non-limiting examples of such computing devices may include workstation computers, laptop computers, server computers, and the like. While the system 100 includes a single analytics service 105, the analytics service 105 may include any number of computing devices operating in a distributed computing environment, such as a cloud environment. The analytics service 105 may be in communication with the computing systems 110, the user devices 115, the instrumentation service 120, and the database 125, via the network 130. While the system 100 includes a single analytics service 105, the analytics service 105 may include any number of computing devices operating in a distributed computing environment, such as a cloud environment.

The computing system 110 may be any computing device comprising of a processor and a non-transitory, machine-readable storage medium capable of performing the various tasks and processes described herein. The computing system 110 may be associated with an entity communicating requests for network operations to the analytics service 105 on behalf of the user devices 115. For instance, the computing system 110 may be a merchant platform system submitting transaction requests for processing to the analytics service 105. To interface or communicate with the analytics service 105, the computing system 110 may register itself with the analytics service 105. The registration information may include, for example, an account identifier, contact information, or a website address, among others. The entity associated with the merchant platform system may have an account set up with the payments processor entity associated or interfacing with the analytics service 205. The computing system 110 may facilitate, host, or otherwise maintain resources accessible by the user devices 115. The resources may be accessible via a web application provided to the user device 115.

The computing system 110 may be in communication with the analytics service 105, the user devices 115, the instrumentation service 120, and the database 125, via the network 130. The computing system 110 may be situated, located, or otherwise associated with at least one server group. Each server group may correspond to a data center, a branch office, or a site at which a subset of servers is situated or associated. In some embodiments, the computing system 110 may be a cloud storage service provider corresponding to a distributed group of servers on a cloud network. In some embodiments, the computing system 110 may be a workstation computer, laptop computer, phone, tablet computer, or server computer, among others.

The user device 115 may be any computing device comprising of a processor and a non-transitory, machine-readable storage medium capable of performing the various tasks and processes described herein. Non-limiting examples of the user device 115 may be a workstation computer, laptop computer, phone, tablet computer, or server computer. During operation, various users may use one or more of the user device 115 to access the functions and resources hosted by the analytics service 105 via one of the computing systems 110, among others. For example, the user may make a transaction request on a webpage or web component associated with the computing system 110 and presented on the display of the user device 115. The user device 115 may send the information for the request to the computing system 110, and the computing system 110 may in generate the request for network operations to the analytics service 105. Even though referred herein as "user" devices, these devices may not always be operated by users.

The instrumentation service 120 may be any computing device comprising of a processor and a non-transitory, machine-readable storage medium capable of performing the various tasks and processes described herein. The instrumentation service 120 may be associated with an entity measuring various characteristics and factors associated with the computing systems 110. For example, the instrumentation service 120 may be associated with a third-party risk assessment service examining for various risk factors from other channels with the computing system 110, such as communications with other computing devices and interfacing with other entities, among others. The instrumentation service 120 may be in communication with the analytics service 105, the computing systems 110, the user devices 115, and the database 125, via the network 130. In some embodiments, the instrumentation service 120 may be part of the analytics service 105. In some embodiments, the instrumentation service 120 may be separate from the analytics service 105 (e.g., as depicted).

The database 125 may store and maintain data for various operations in the system 100. The database 125 may be in communication with the analytics service 105, the computing system 110, the user devices 115, and the instrumentation service 120, among others, via the network 130. In some embodiments, the database 125 may include a database management system (DBMS) to arrange and organize the data maintained across the databases. In some embodiments, the database 125 may be a part of the analytics service 105. In some embodiments, the database 125 may be separate from the analytics service 105 (e.g., as depicted).

The above-mentioned components may be connected to each other through a network 130. The examples of the network 130 may include, but are not limited to, private or public LAN, WLAN, MAN, WAN, and the Internet. The network 130 may include both wired and wireless communications according to one or more standards and/or via one or more transport mediums. The communication over the network 130 may be performed in accordance with various communication protocols such as Transmission Control Protocol and Internet Protocol (TCP/IP), User Datagram Protocol (UDP), and IEEE communication protocols. In one example, the network 130 may include wireless communications according to Bluetooth specification sets or another standard or proprietary wireless communication protocol. In another example, the network 130 may also include communications over a cellular network, including, e.g., a GSM (Global System for Mobile Communications), CDMA (Code Division Multiple Access), and/or EDGE (Enhanced Data for Global Evolution) network.

Figure 2:
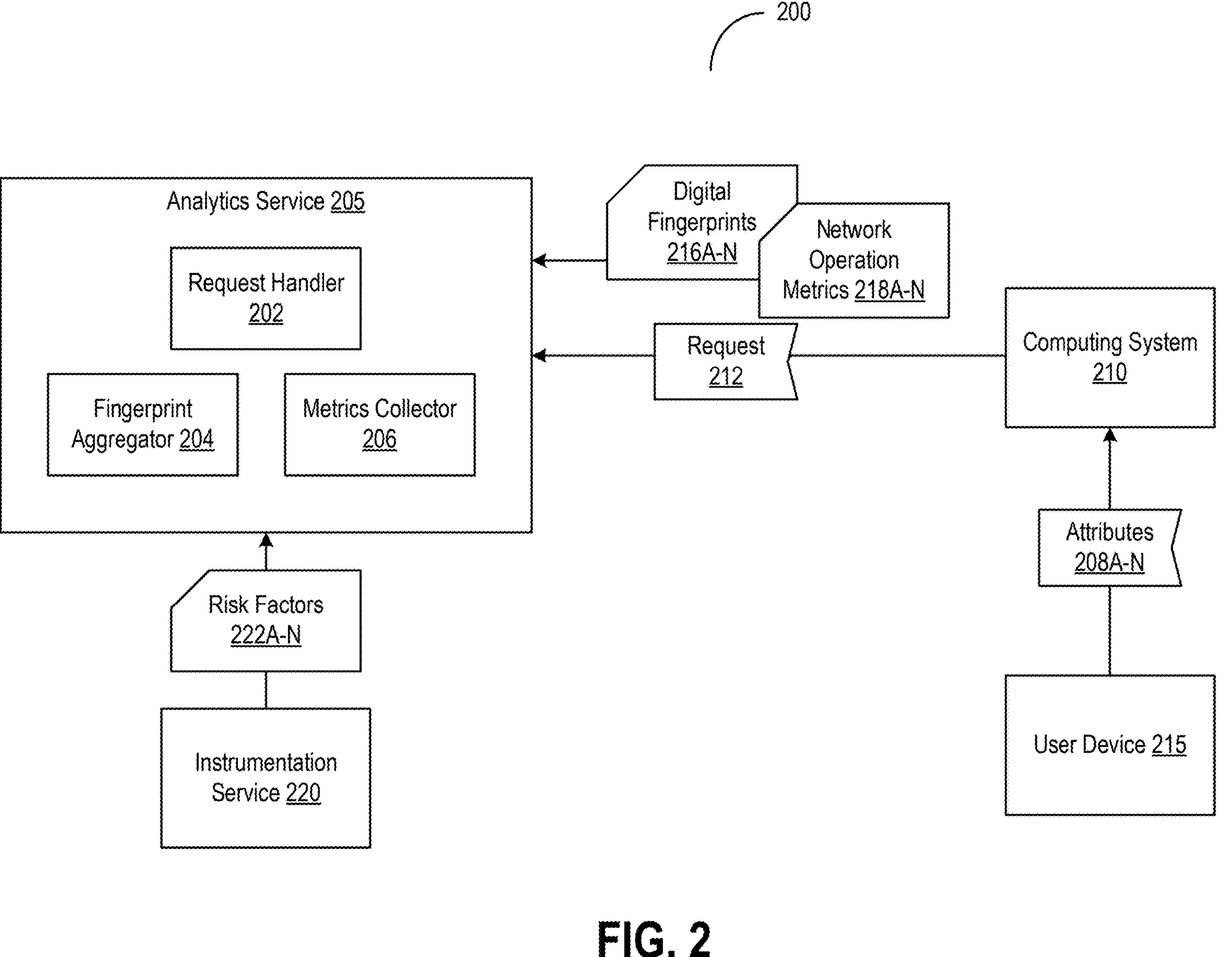
FIG. 2 depicts a block diagram of a system to collect digital fingerprints of identities and network operation metrics, in accordance with an illustrative embodiment.

FIG. 2 depicts a block diagram of a system 200 to collect digital fingerprints of identities and network operation metrics. The system 200 may include at least one analytics service 205, at least one computing system 210, at least one user device 215, and at least one instrumentation service 220, among others. The analytics service 205 may include at least one request handler 202, at least one fingerprint aggregator 204, and at least one metrics collector 206, among others. The analytics service 205 may be partly integrated with other services to facilitate the determination of the fraud score. For example, the analytics service 205 may be part of a risk management system to determine merchant risk scoring for merchant entities (e.g., associated with computing systems 210). Embodiments may comprise additional or alternative components or omit certain components from those of FIG. 2 and still fall within the scope of this disclosure. Various hardware and software components of one or more public or private networks may interconnect the various components of the system 200. Each component in system 200 may be any computing device comprising one or more processors coupled with memory and software and capable of performing the various processes and tasks described herein.

The user device 215 sends, transmits, or otherwise provides a set of attributes 208A-N (hereinafter generally referred to as attributes 208) to the computing system 210. The attributes 208 may specify, define, or otherwise identify values for network operations to be performed on the analytics service 205. As used herein, a network operation may represent a transaction. Specifically, a network operation may represent a sequence of processes to be performed by the server using the attributes provided in the request (e.g., transaction attributes) to facilitate the transaction. The server may perform the sequence of processes for the transaction in accordance with the requested network operation and may return a response to the computing system based on the performance of the network operation. For instance, if the network operation has succeeded, the transaction is approved and facilitated by the server.

The network operations may be initiated by the user device 215 and performed through the computing system 210. The network operations may correspond to a sequence of processes to be performed by the analytics service 205 (or in conjunction with the computing system 210 and the user device 215) using the attributes 208. For example, the attributes 208 may be values entered in by a user of the user device 215 on a graphical user interface of a website provided by the computing system 210 to initiate a transaction request (e.g., to purchase an item or service). The attributes 208 may include, for example, an identifier for the user of the user device 215 (e.g., account identifier or network address such as an Internet Protocol address), a type of network operation (e.g., function or transaction type) to be performed, parameters for the type of network operation (e.g., function inputs such as item identifier or current amount), among others. Upon entry, the user device 215 may send, transmit, or otherwise provide the set of attributes 208 to the computing system 210.

The computing system 210 provides, transmits or otherwise sends at least one electronic request 212 (sometimes herein referred to as a request) to execute the network operations using the set of attributes 208 provided by the user device 215. The computing system 210 may retrieve, identify, or otherwise receive the set of attributes 208 provided by the user device 215. Upon receipt, the computing system 210 may parse or process the set of attributes 208 including values defining the network operations. The computing system 210 may create, produce, or otherwise generate the electronic request 212 using the set of attributes 208. In some embodiments, the computing system 210 may add one or more additional attributes 208 for the electronic request 212. For example, the additional attributes 208 may include an identity (e.g., network address or account identifier) corresponding to the computing system 210, an identifier corresponding to the user device 215, and a timestamp for the electronic request 212, among others. In some cases (e.g., where the entity associated with the computing system 210 is malicious or fraudulent), the computing system 210 may create, produce, or otherwise generate the set of attributes 208 for the electronic request 212, independent of any user device 215. With the generation of the electronic request 212, the computing system 210 may provide, transmit, or otherwise send the electronic request 212 to the analytics service 205.

The request handler 202 on the analytics service 205 retrieves, identifies, or otherwise receives the electronic request 212 from the computing system 210. The electronic request 212 may indicate execution of the network operation using the set of attributes 208 provided by the user device 215 to the computing system 210. With the receipt, the request handler 202 may parse or process the electronic request 212 to extract or identify the set of attributes 208 for the network operation. The request handler 202 may determine, select, or otherwise identify an identity of the computing system 210 from which the electronic request 212 is received. Prior to executing the network operation identified in the electronic request 212, the request handler 202 may initiate processes on the analytics service 205 to check whether any fraudulence is caused by the computing system 210. The request handler 202 may invoke the fingerprint aggregator 204 and the metrics collector 206 to retrieve data to be used to determine likelihood of fraudulence for the computing system 210. In some embodiments, the invocation of the fingerprint aggregator 204 and the metrics collector 206 to retrieve data to determine likelihood of fraudulence for the computing system 210, independent of receipt of any electronic request 212.

The fingerprint aggregator 204 on the analytics service 205 obtains, identifies, or otherwise retrieves a set of digital fingerprints 216A-N (hereinafter generally referred to as digital fingerprints 216) associated with the identity of the computing system 210. The set of digital fingerprints 216 may include or identify information about the identity of the computing system 210. The digital fingerprints 216 may be derived from information, independent from the attributes 208 for the electronic request 212. The digital fingerprints 216 may include, for example, an account identifier (e.g., a username to register with the analytics service 205 or bank account identifier for financial transactions) associated with the computing system 210, an identifier (e.g., personal identifier, account identifier, or entity name) corresponding to the entity associated with the computing system 210, contact information (e.g., phone number or address) associated with the entity, location information (e.g., physical location) associated with the entity, an electronic mail address associated with the entity or the computing system 210, a web address (e.g., a uniform resource locator (URL)) for the computing system 210, a network address (e.g., Internet Protocol (IP) address) for the computing system 210, or other information (e.g., doing business as (DBA) information or submission identifier and cookie-related information including history for the computing system 210), among others.

To retrieve, the fingerprint aggregator 204 may collect, retrieve, or otherwise obtain the information about the identity of the computing system 210 from one or more data sources. In some embodiments, the fingerprint aggregator 204 may access registration information for the computing system 210 maintained by the analytics service 205 (e.g., on database). The registration information may be first created by the analytics service 205 for the computing system 210 (e.g., when the entity associated with the computing system 210 is signing up) and may be updated from previous communication sessions between the analytics service 205 and the computing system 2100. The registration information may include, for example, the account identifier, the entity identifier, and contact information about the entity associated with the computing system 110. In some embodiments, the fingerprint aggregator 204 may communicate with another service (e.g., the instrumentation service 220) to obtain the digital fingerprints 216. With the identification, the fingerprint aggregator 204 may use the information about the identity to create, form, or generate the set of digital fingerprints 216.

The metrics collector 206 on the analytics service 205 obtains, identifies, or otherwise retrieves a set of network operation metrics 218A-N (hereinafter generally referred to as the set of network operation metrics 218) associated with the computing system 210. The set of network operation metrics 218 may identify or include any number of metrics characterizing previous communications and network operations performed at the analytics service 205 (or another third-party service) in response to prior requests from the computing system 210. The set of network operation metrics 218 may include or identify, for example: a number or rate of disputes (e.g., challenge of a previous transaction request), a number or rate of reversals (e.g., refund requests), a number or rate of denials (e.g., requests determined to be rejected), a number or rate of requests, a number or rate of anomalies, among others. In some embodiments, the network operation metrics 218 may be defined over a time window. For example, the set of network operation metrics 218 may identify a number of disputes (e.g., challenge of a previous transaction request), a number of reversals (e.g., refund requests), and a number of denials (e.g., requests determined to be rejected), in a time-series form. The network operation metrics 218 may be maintained by the analytics service 205 (e.g., on a database) for the computing system 210 based on previous communications and network operations performed at the analytics service 205 in response to prior requests from the computing system 210.

In some embodiments, the metrics collector 206 may obtain, identify, or otherwise retrieve a set of risk factors 222A-N (hereinafter generally referred to as risk factors 222) associated with the computing system 210 from the instrumentation service 220. The set of risk factors 222 may include information besides the information included in the set of digital fingerprints 216 or the set of network operation metrics 218 to be used to assess the likelihood of fraudulence for the computing system 210. The set of risk factors 222 may include, for example, requests for network operations performed at other services (e.g., for transaction requests or other sequence of processes), activity of other computing systems associated with the entity (e.g., the same entity as the computing system 210), indications of fraudulent or unauthorized attempts at access on other services by the computing system 210, and the content on the webpage corresponding to the address of the computing system 210, among others. The set of risk factors 222 may be maintained and updated by the instrumentation service 220 (e.g., using communications on a network originating from the computing system 210 or related entities). The metrics collector 206 may interface or communicate with the instrumentation service 220 to obtain or retrieve the set of risk factors 222 therefrom. By retrieving the risk factors 222 along with the digital fingerprints 216 and the network operation metrics 218, the metrics collector 206 may allow the analytics service 205 to determine the likelihood of fraudulence of the computing system 210 itself. The information derivable from the risk factors 222 along with the digital fingerprints 216 and the network operation metrics 218 may be used to assess risks different from the risks imposed by individual requests (e.g., the electronic request 212) from the computing system 210, thereby adding another layer of security against unwarranted access attempts of resources.

Figure 3:
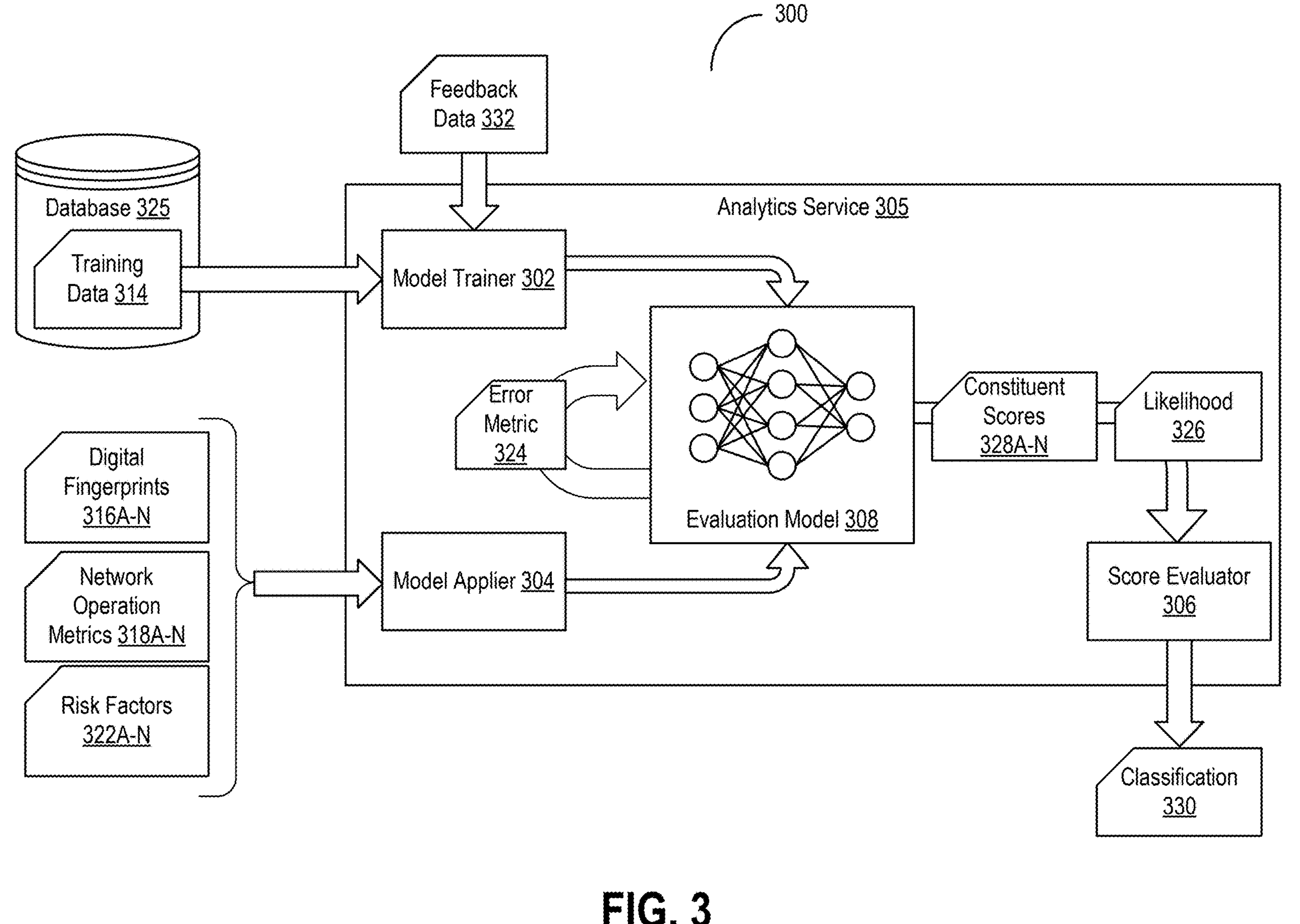
FIG. 3 depicts a block diagram a system to execute machine learning (ML) model to determine likelihoods of fraud, in accordance with an illustrative embodiment.

FIG. 3 depicts a block diagram system 300 to execute machine learning (ML) model to determine likelihoods of fraud. The system 300 may include at least one analytics service 305 and at least one database 325, among others. The analytics service 305 may include at least one model trainer 302, at least one model applier 304, at least one score evaluator 306, and at least one evaluation model 308, among others. The analytics service 305 (including the evaluation model 308) may be partly integrated with other services to facilitate the determination of the fraud score. The analytics service 305 and the functionalities of the evaluation model 308 may be accessible to the other services. For example, the evaluation model 308 may be accessible via an application programming interface (API) by a risk management system to determine merchant risk scoring for merchant entities (e.g., associated with computing systems 310). Embodiments may comprise additional or alternative components or omit certain components from those of FIG. 3 and still fall within the scope of this disclosure. Various hardware and software components of one or more public or private networks may interconnect the various components of the system 300. Each component in system 300 may be any computing device comprising one or more processors coupled with memory and software and capable of performing the various processes and tasks described herein.

The model trainer 302 creates, produces, or otherwise generates training data 314 to train the evaluation model 308. The training data 314 may be derived from previous examples of inputs associated with computing systems and expected outputs regarding fraudulence for the computing systems. The model trainer 302 may generate the training data 314 to include a set of digital fingerprints for a sample computing system. The digital fingerprints may identify or include any information associated with an identity of the computing system. The digital fingerprints may include, for example, an account identifier, an identifier corresponding to an entity associated with the computing system, contact information associated with the entity, location information, an electronic mail address, or a web address, among others. The model trainer 302 may insert, add, or otherwise include a set of network operation metrics for the sample computing system to the training data 314. The network operation metrics may identify or include any number of metrics characterizing previous communications and network operations performed in response to electronic requests from the sample computing system. The set of network operation metrics may include or identify, for example: a number or rate of dispute, a number or rate of reversals, a number or rate of denials, a number or rate of requests, a number or rate of anomalies, among others.

In some embodiments, the model trainer 302 may insert, add, or otherwise include a set of risk factors for the sample computing system. The risk factors may include information besides the information included in the set of digital fingerprints or the set of network operation metrics to be used to assess the likelihood of fraudulence for the given, sample computing system. The set of risk factors may include, for example, requests for network operations performed at other services, the activity of other computing systems associated with the entity, indications of fraudulent or unauthorized attempts at access on other services by the computing system, and the content on the webpage corresponding to the web address of the computing system, among others. The model trainer 302 may add the risk factors associated with the sample computing system from an instrumentation service tracking the sample computing system. In some embodiments, the model trainer 302 may generate the training data 314 to include one or more of the digital fingerprints, the network operation metrics, and the risk factors for the sample computing system, as an example input dataset. The digital fingerprints, the network operation metrics, and the risk factors collectively may be used as the inputs to the evaluation model 308 during training.

In addition, the model trainer 302 may label the training data 314 to indicate whether fraudulence is caused by the sample computing system. The model trainer 302 may insert, add, or otherwise include at least one label to indicate whether fraudulence is caused by the sample computing system, for the corresponding example dataset of digital fingerprints, the network operation metrics, and the risk factors. The label may be derived from previous indications of fraudulence. For example, the label may be manually created or inputted by a system administrator (or another user) inspecting information and network traffic associated with the sample computing system. The label may indicate a presence or absence of fraudulence for the sample computing system. With this indication, the model trainer 302 may identify the corresponding digital fingerprints, the network operation metrics, and the risk factors for the sample computing system. The model trainer 302 may repeat the inclusion of digital fingerprints, network operation metrics, risk factors, and labels, as a multitude of examples into the training data 314. The model trainer 302 may store and maintain the training data 314 on the database 325.

In conjunction, the model trainer 302 may initialize, train, and establish the evaluation model 308. The evaluation model 308 may be a machine learning model or artificial intelligence algorithm in accordance with any architecture. The architecture may include, for example, an artificial neural network (ANN) (e.g., autoencoder, convolutional neural network (CNN), recurrent neural network (RNN), long short-term memory network (LSTM), or transformer), a large language model (LLM) (e.g., based on transformer architecture, RNN, or bidirectional encoders), a support vector machine (SVM), a clustering model (e.g., k-nearest neighbor model), a Bayesian classifier, a decision tree, a regression model (e.g., a linear or logarithmic model), or a random forest, among others. In general, the evaluation model 308 may include a set of inputs and a set of outputs, related to each other via a set of weights (or parameters or kernel parameters). The set of weights may be arranged in accordance with the architecture. When initialized, the set of weights may be set or assigned to defined values (e.g., random values).

With the identification of the training data 314, the model trainer 302 may carry out perform, or otherwise execute the evaluation model 308 using the training data 314. In some embodiments, the model trainer 302 may feed or apply one or more of the sets of digital fingerprints, the set of network operations metrics, and the set of risk factors into the evaluation model 308. In executing, the model trainer 302 may input the training data 314 (e.g., example by example) into the evaluation model 308. Upon input, the model trainer 302 may process the input training data 314 in accordance with the set of weights of the evaluation model 308. From processing, the model trainer 302 may produce, determine, or otherwise generate at least one likelihood of fraud caused by the sample computing system associated with the input. The likelihood of fraud may indicate or identify a probability that the sample computing system is fraudulent. In some embodiments, the model trainer 302 may produce, determine, or otherwise generate a set of constituent scores corresponding to a set of fraud indicators (or signals). Each constituent score may indicate a degree of contribution that a corresponding fraud indicator provided to the likelihood of fraud. The fraud indicator may correspond to one of the inputs, such as any of the digital fingerprints, network operations metrics, or risk factors. The set of constituent scores may be combined to generate the likelihood of fraud by the evaluation model 308.

Using the output, the model trainer 302 may compare the output likelihood of fraud with labeled training data 314 to generate, calculate, or otherwise determine at least one error metric 324 in accordance with a loss function. The loss function may include, for example, a norm loss (e.g., L1 or L2), mean absolute error (MAE), mean squared error (MSE), a quadratic loss, a cross-entropy loss, and a Huber loss, among others. In general, the more deviated the output likelihood of fraud is from the label, the higher the error metric 324 may be. Conversely, the less deviated the more deviated the output likelihood of fraud is from the label, the lower the error metric 324 may be. In some embodiments, the model trainer 302 may compare the likelihood of fraud with the label indicating whether fraudulence is caused by the sample computing system to determine the error metric 324. In some embodiments, the model trainer 302 may compare a classification determined from the likelihood with the label to determine the error metric 324. The model trainer 302 may select, determine, or otherwise identify the classification from a set of classifications for the computing system based on the likelihood of fraud. Each classification may correspond to a range of values of the likelihoods.

The model trainer 302 may modify, adjust, or otherwise update one or more of the set of weights of the evaluation model 308 using the error metric 324. The updating of weights of evaluation model 308 may be in accordance with an optimization function. The optimization function may define one or more rates or parameters at which the weights of the evaluation model 308 are to be updated. The optimization function may be in accordance with stochastic gradient descent, and may include, for example (e.g., when the evaluation model 308 is implemented using artificial neural networks (ANN)), an adaptive moment estimation (Adam), implicit update (ISGD), and adaptive gradient algorithm (AdaGrad), among others. The model trainer 302 may update the weights of the evaluation model 308 using more and more examples in the training data 314 until convergence. Upon completion of training, the model trainer 302 may store and maintain the set of weights for the evaluation model 308 on a database for inference from newly acquired inputs (e.g., digital fingerprints, network operation metrics, and risk factors).

With the establishment, the model applier 304 may carry out perform, or otherwise execute the evaluation model 308 using one or more of: a set of digital fingerprints 316A-N (hereinafter generally referred to as fingerprints 316), a set of network operation metrics 318A-N (hereinafter generally referred to as network operation metrics 318), and a set of risk factors 322A-N (hereinafter generally referred to as risk factors 322), among others. In some embodiments, the model applier 304 may carry out perform, or otherwise execute the evaluation model 308 using the set of digital fingerprints 316 and the set of network operations metrics 318. In some embodiments, the model applier 304 may carry out perform, or otherwise execute the evaluation model 308 using the set of digital fingerprints 316, the set of network operations metrics 318, and the set of risk factors 322. In some embodiments, the model applier 304 may execute the evaluation model 308 in response to an invocation by another service. The invocation may be via a request or command defined in accordance with an API. For instance, an administrator of a risk management system examining risks originating from one or more merchant entities can invoke the model applier 304 to execute the evaluation model 308 via the corresponding API function call.

In executing, the model applier 304 may input the set of digital fingerprints 316, the set of network operations metrics 318, or the set risk factors 322 into the evaluation model 308. Upon input, the model applier 304 may process the input in accordance with the set of weights of the evaluation model 308. From processing, the model applier 304 may produce, determine, or otherwise generate at least one likelihood 326 of fraud caused by the computing system. The likelihood 326 may indicate a probability that the fraudulence is caused by the computing system or that the computing system (or the entity associated with the computing system) is fraudulent. In some embodiments, from executing the evaluation model 308, the model applier 304 may produce, determine, or otherwise generate a set of constituent scores 328A-N (hereinafter generally referred to as constituent scores 328) for a corresponding set of fraud indicators (or fraud signals). Each score 328 may indicate a degree of contribution that a corresponding fraud indicator factored into the determination of the likelihood of fraud. The set of fraud indicators may correspond to one of the inputs or data points in any of the set of digital fingerprints 316, the set of network operations metrics 318, and the set risk factors 322. The constituent scores 328 may be used to determine or assess the underlying causes or factors for the fraudulence caused by the computing system or the associated entity. For example, a high constituent score 328 for the contact information as identified in the digital fingerprints 316 may indicate that the contact information led to a high value for the likelihood 326. In some embodiments, the model applier 304 may generate the likelihood 326 as a combination of the set of constituent scores 328 in accordance with the set of weights in the evaluation model 308.

With the generation, the score evaluator 306 may compare the likelihood 326 with a threshold to determine whether the fraudulence is caused by the computing system. The threshold may delineate, identify, or otherwise define a value for the likelihood 326 at which the fraudulence is determined to be caused by the computing system. When the likelihood 326 of fraud exceeds the threshold, the score evaluator 306 may identify or determine that the fraudulence is caused by the computing system. On the other hand, when the likelihood 326 of fraud does not exceed the threshold, the score evaluator 306 may identify or determine that the fraudulence is not caused by the computing system. In some embodiments, the score evaluator 306 may determine whether fraudulence is caused by the computing system as a function of the constituent scores 328. In determining, the score evaluator 306 may compare each constituent score 328 to a respective threshold for the type of constituent score. When at least one (or a specified number) of the constituent scores 328 exceeds the respective threshold, the score evaluator 306 may identify or determine that the fraudulence is caused by the computing system. On the other hand, when all (or a specified number) of the constituent scores 328 does not exceed the threshold, the score evaluator 306 may identify or determine that the fraudulence is not caused by the computing system.

In some embodiments, the score evaluator 306 may select, identify, or otherwise determine a classification 330 for the computing system from a set of classifications based on the likelihood 326. The classification 330 may indicate a degree of severity of the fraudulence caused by the computing system, in view of the likelihood 326 of fraud. Each classification in the set of classification may correspond to a respective range of values of the likelihood. For example, the set of classification may include no fraud risk group corresponding to a range of values 0.0 to 0.3, a low fraud risk group corresponding to a range of values between 0.3 to 0.6, a high fraud risk group corresponding to a range of values between 0.6 to 0.8, and an extremely high fraud risk group corresponding to a range of values between 0.8 and 1.0. Based on a comparison of the likelihood 326 with the range of values for each classification, the score evaluator 306 may determine the classification 330 for the computing system, with a range of values encompassing the likelihood 326. In some embodiments, the score evaluator 306 may select, identify, or otherwise determine the classification 330 (e.g., directly) by inputting the set of digital fingerprints 316, the set of network operations metrics 318, or the set risk factors 322 into the evaluation model 308.

In some embodiments, separate from training using the training data 314, the model trainer 302 may modify, change, or otherwise update the evaluation model 308 using feedback data 332. The feedback data 332 may include information to update the evaluation model 308 based on the output from the evaluation model 308 using the set of digital fingerprints 316, the set of network operations metrics 318, and the set of risk factors 322. The feedback data 332 may identify or indicate whether fraudulence is caused by the computing system associated with. The model trainer 302 may retrieve, obtain, or otherwise receive the feedback data 332 via a user interface. For example, the feedback data 332 may be inputted, created, or otherwise generated by a system administrator (or payment processor entity) in response to the presentation of the likelihood 326, the constituent scores 328, or the classification 330 for the computing system on the user interface. With the receipt, the model trainer 302 may compare the feedback data 332 with the likelihood 326 to calculate, generate, or otherwise generate another error metric in accordance with the loss function. The model trainer 302 may modify, adjust, or otherwise update one or more of the set of weights of the evaluation model 308 using the error metric as detailed herein.

Figure 4:
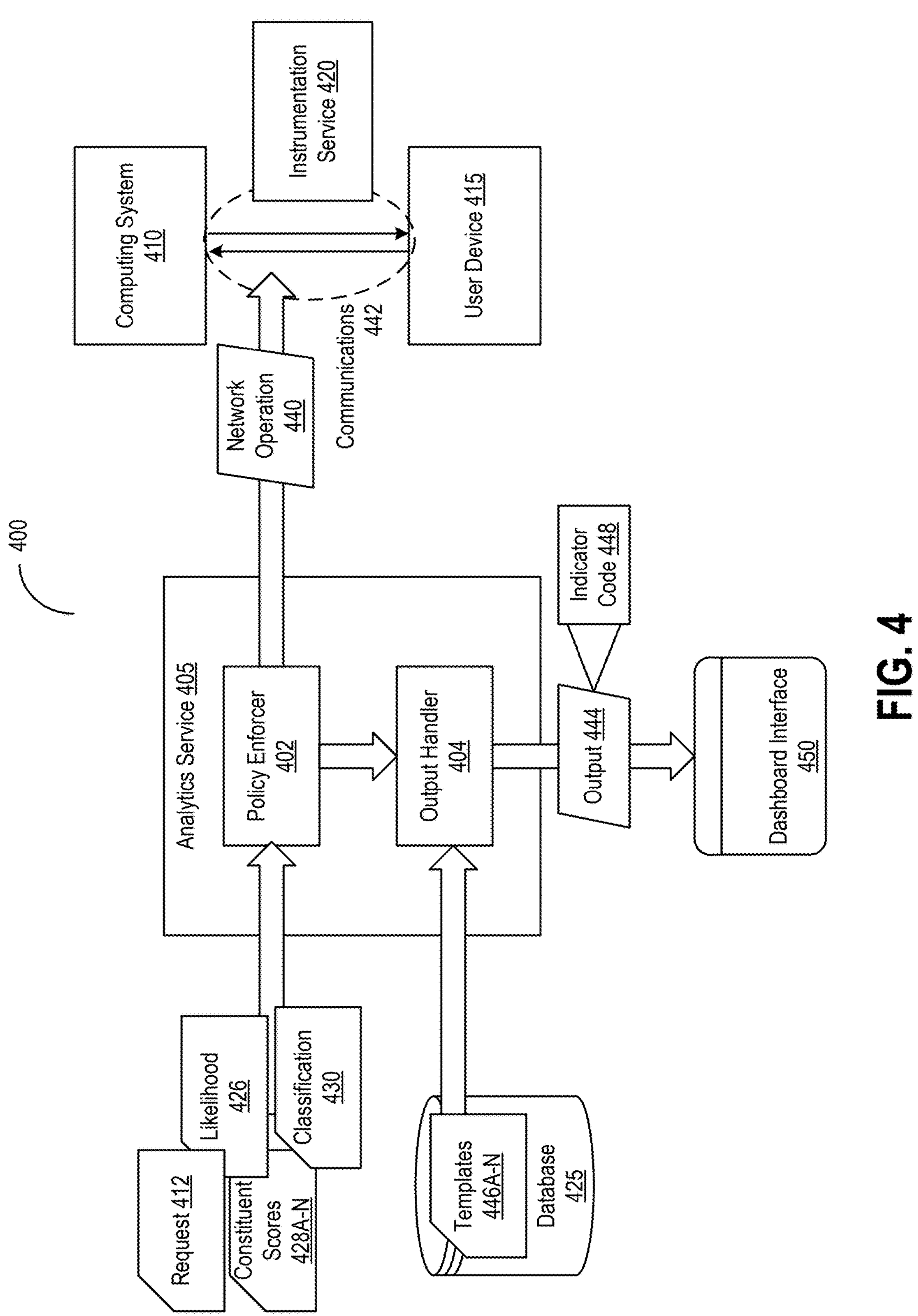
FIG. 4 depicts a block diagram of a system to control network operations associated with computing systems based on likelihoods of fraud, in accordance with an illustrative embodiment.

FIG. 4 depicts a block diagram of a system 400 to control network operations associated with computing systems based on likelihoods of fraud. The system 400 may include at least one analytics service 405, at least one computing system 410, at least one user device 415, at least one instrumentation service 420, and at least one database 425, among others. The analytics service 405 may include at least policy enforcer 402 and at least one output handler 404, among others. The analytics service 405 may be partly integrated with other services to facilitate the determination of the fraud score. For example, the analytics service 405 may be part of a risk management system to determine merchant risk scoring for merchant entities (e.g., associated with computing systems 410). Embodiments may comprise additional or alternative components or omit certain components from those of FIG. 4 and still fall within the scope of this disclosure. Various hardware and software components of one or more public or private networks may interconnect the various components of the system 400. Each component in the system 400 may be any computing device comprising one or more processors coupled with memory and software and capable of performing the various processes and tasks described herein.

The policy enforcer 402 on the analytics service 405 may identify or select one or more network operations 440 to execute based on a likelihood 426. The network operations 440 may be used to control communications 442 associated with the computing system 410, such as subsequent electronic requests received from the computing system 410 and initiated by the user device 415. When the likelihood 426 does not exceed the threshold or the computing system 410 is determined to be not the cause of fraudulence, the policy enforcer 402 may select the network operation 440 in accordance with an electronic request 412 from the computing system 410. The network operation 440 may be the same as the original network operation identified in the electronic request 412. The network operation 440 as defined by the electronic request 412 may be to carry out the requested transaction corresponding to a sequence of operations to be performed via the analytics service 105 (or via another service accessing the analytics service 105). For instance, the request transaction may be for the merchant entity associated with the computing system 410. The requested transaction may include, for instance, a database query, a read/write command, a request for payment, a transfer request, a file request, or an information request, among others.

With the selection, the policy enforcer 402 may execute the network operation 440 using the attributes in accordance with the electronic request 412. The policy enforcer 402 may refrain from performing other network operations associated with when the likelihood 426 exceeds the threshold. For example, the policy enforcer 402 may refrain from rerouting the electronic request 412 for additional inspection and from generation of a data record to indicate additional inspection for subsequent electronic requests from the computing system 410. In some embodiments, the policy enforcer 402 may produce, output, or otherwise generate an indication that fraudulence is not caused by the computing system 410. By extension, the policy enforcer 402 may refrain from generating an alert to indicate fraudulence is caused by the computing system 410.

Conversely, when the likelihood 426 exceeds the threshold or the computing system 410 is determined to be the cause of fraudulence, the policy enforcer 402 may select one or more network operations 440. The network operations 440 selected when the likelihood 426 exceeds the threshold may differ from the original network operation as defined by the electronic request 412 from the computing system 410. For example, the network operations 440 may include heightened or additional inspection of the electronic request 412, such as deep packet inspection (DPI), stateful packet inspection (SPI), traffic profiling, metadata analysis, among others. With the selection, the policy enforcer 402 may execute the network operation 440 using at least a portion of the attributes, instead of executing the network operation originally defined in the electronic request 412.

In some embodiments, policy enforcer 402 may redirect, forward, or otherwise redirect at least a portion of the attributes of the electronic request 412 for further inspection. The network operations 440 may include restricting or controlling of communications 442 from the computing system 410 including subsequent requests for network operations from the computing system 410. In addition, the policy enforcer 402 may create, output, or otherwise generate at least one data record to add to subsequent electronic requests from the computing system 410 to indicate a requisition for additional inspection. The data record may include an identifier corresponding to the computing system 410 and an indicator for the requisition for inspection, among others. In some embodiments, the policy enforcer 402 may produce, output, or otherwise generate at least one alert to indicate that fraudulence is caused by the computing system 410.

In some embodiments, the policy enforcer 402 may identify or select the network operation 440 from a set of candidate network operations based on the classification 430 of the computing system 410. The set of candidate network operations may include or identify, for instance, a rejection of subsequent electronic requests from the computing system 410 (e.g., when classified as extremely high fraud risk), a routing of subsequent electronic requests from the computing system 410 for additional inspection (e.g., when classified as high fraud risk), generation of an alert to indicate that the computing system 410 as a cause of fraudulence (e.g., when classified as moderate fraud risk), or process original electronic request according to normal procedures (e.g., when classified as low fraud risk), among others. Each classification may correspond to a respective candidate network operation. From the set of candidate network operations, the policy enforcer 402 may select the one or more network operations 440 that correspond to the classification 430.

With the selection, the policy enforcer 402 may perform, carry out, or otherwise execute the one or more network operations 440. When the classification 430 for the computing system 410 is extremely high risk (e.g., likelihood 426 ranging between 0.8 to 1.0), the policy enforcer 402 may block or terminate additional processing of the electronic request 412 from the computing system 410. In addition, the policy enforcer 402 may block, prevent, or otherwise restrict network operations in subsequent electronic requests from the computing system 410. When the classification 430 for the computing system 410 is high risk (e.g., likelihood 426 ranging between 0.6 to 1.8), the policy enforcer 402 may route the electronic request 412 for additional inspection. The policy enforcer 402 may generate a data record to add to subsequent electronic requests from the computing system 410 to indicate a requisition for additional inspection. When the classification 430 for the computing system 410 is a moderate risk (e.g., likelihood 426 ranging between 0.25 to 0.6), the policy enforcer 402 may create, produce, or otherwise generate at least one alert to indicate that fraudulence is caused by the computing system 410.

When the classification 430 for the computing system 410 is low risk (e.g., likelihood 426 ranging between 0.0 to 0.25), the policy enforcer 402 may execute the network operation 440 in accordance with the electronic request 412 from the computing system 410. The network operation 440 may be the same as the original network operation identified in the electronic request 412. In addition, the policy enforcer 402 may allow or permit network operations in subsequent electronic requests from the computing system 410. In some embodiments, the policy enforcer 402 may refrain from routing the electronic request 412 for additional inspection. In some embodiments, the policy enforcer 402 may refrain from generation of the data record to add to subsequent electronic requests from the computing system 410 to indicate a requisition for additional inspection. In some embodiments, the policy enforcer 402 may refrain from generation of the alert to indicate that fraudulence is caused by the computing system 410. In some embodiments, policy enforcer 402 may wait to execute the network operations 440 until input from the system administrator of the analytics service 405.

In conjunction, the output handler 404 on the analytics service 405 may create, produce, or otherwise generate at least one output 444 for presentation on at least one dashboard interface 450. The output 444 may include analytics and information associated with the computing system 410. The output 444 may include a script or instructions for presentation of the information on the dashboard interface 450. To generate the output 444, the output handler 404 may use an association of the computing system 410 with any one or more the following: the likelihood 426, a set of constituent scores 428A-N (hereinafter generally referred to as constituent scores 428), the classification 430, the set of digital fingerprints (e.g., an account identifier, contact information, entity identifier, or web address), the set of network operation metrics (e.g., rate of disputes, reversals, requests, or other anomalies), or the set of risk factors (e.g., detection of fraudulent or malicious access attempts at other services), among others. Each score 428 may indicate a degree of contribution that a corresponding fraud indicator (e.g., an input corresponding to one or more of digital fingerprints, network operation metrics, or other risk factors) factored into the determination of the likelihood 426 of fraud. In some embodiments, the output handler 404 may also include data associated with the network operations 440 selected or executed by the policy enforcer 402. For example, the output handler 404 may include an identification of the selected network operations 440 to the output 444.

In some embodiments, the output handler 404 may identify or select at least one of a set of templates 446A-N (hereinafter generally referred to as templates 446) based on one or more of: the likelihood 426, the set of constituent scores 428, or the classification 430 for the computing system 410. The template 446 may identify, define, or otherwise specify a format in which the output 444 is to be generated using the information for the computing system 410. For example, the template 446 may specify placement of user interface elements to indicate constituent scores 428 and the classification 430 for the computing system 410. The templates 446 may be used to indicate to the system administrator whether the fraudulence is caused by the computing system 410, and if so, any underlying factors or causes leading to the detection of the fraudulence. At least one of the templates 446 may specify the inclusion of indicator codes to identify potential causes for the fraudulence associated with the computing system 410. Each indicator code may include a defined set of alphanumeric characters (e.g., in human-readable or interpretable messages) to indicate the potential cause for the fraudulence. In some embodiments, at least one template 446 may specify inclusion of selected network operations 440. Each template 446 may specify a set of criterion for the values of the likelihood 426, the set of constituent scores 428, or the classification 430 for which the template 446 is to be selected. For example, the set of criterion may define that when the constituent score 428 associated with the email address of the entity for the computing system 410 is above a certain value, the corresponding template 446 is to be selected. The indicator for the corresponding template 446 may having text including "Suspicious email address for merchant."

By comparing the values with the criterion for each of the templates 446, the output handler 404 may select at least one template 446. With the selection, the output handler 404 may generate the output 444 to include one or more indicator codes 448 in accordance with the template 446. For instance, when the constituent score 428 for the rate of disputed transaction requests is high and the computing system 410 is determined to be high-risk for fraudulence, the output handler 404 may generate the output 444 to include at least one indicator code 448 as defined by the template 446, to identify the abnormally high rates of disputed transaction requests. In addition, the policy enforcer 402 may include an identification of recommended mitigation actions corresponding to the selected network operations 440.

With generation of the output 444, the output handler 404 may send, provide, or otherwise transmit the output 444 for presentation via the dashboard interface 450. In some embodiments, in conjunction with the execution of the network operation 440, the output handler 404 may transmit the output 444 for presentation on the dashboard interface 450. For example, when the likelihood 426 exceeds the threshold, the output handler 404 may transmit at least one alert to indicate that fraudulence is caused by the computing system 410. The alert may appear as a pop-up message window on the dashboard interface 450. In some embodiments, the output handler 404 may provide the output 444 to indicate a status or completion of the network operation 440 executed by the policy enforcer 402.

Upon receipt, the dashboard interface 450 (or a computing device upon which the dashboard interface 450 is presented) may display or present the output 444. The dashboard interface 450 may be a graphical user interface (GUI) including one or more user interface elements to present the output 444. For example, the dashboard interface 450 may be used by the system administrator of the analytics service 405 to inspect and examine fraudulence analytics associated with any number of computing systems. In some embodiments, the output handler 404 may retrieve, identify, or otherwise receive interaction data associated with the dashboard interface 450. The interaction data may, for example, identify a selection of at least one of the network operations 440 to control communications associated with the computing system 410. The output handler 404 may parse or process the interaction data to identify the selected network operation 440 and may pass the identification to the policy enforcer 402. The policy enforcer 402 in turn may carry out or execute the selected network operation 440.

In this manner, the analytics service may use information about a computing system, such as digital fingerprint of an identity and prior network operation metrics, to detect whether fraudulence is caused by the computing system. The detection of fraudulence may be performed separately from validating and authenticating the electronic requests from the computing system. By detecting fraudulence, the analytics service may improve and enhance security to processes and resources, from being accessed by unwarranted or fraudulent entities, thus lowering the chances of data breach and other security lapses. The dashboard interface provided by the analytics service may also provide additional information to assist the system administrator at examining and diagnosing any potential issues with fraudulent issues and take mitigation actions to reduce the chances of improper access. Moreover, instead of processing and evaluating each individual request for validation and authentication, the analytics service may be able to control or administer network operations requested by computing systems on an entity-by-entity basis, significantly save computing resources that would have otherwise been consumed in processing individual requests.

FIG. 5A depicts a screenshot of a user interface 500 for presenting a list of accounts for computing systems and indications of status based on likelihoods of fraud. In some embodiments the list of accounts may be associated with merchants. As depicted, the user interface 500 may present a list of computing system entities referenced by account identifiers, a status for each computing system entity, an identification of fraudulence by any of the entities, and other information. In the depicted example, the user interface 500 may include an indication of fraudulence for the account named "John Smith."

Figure 5B:
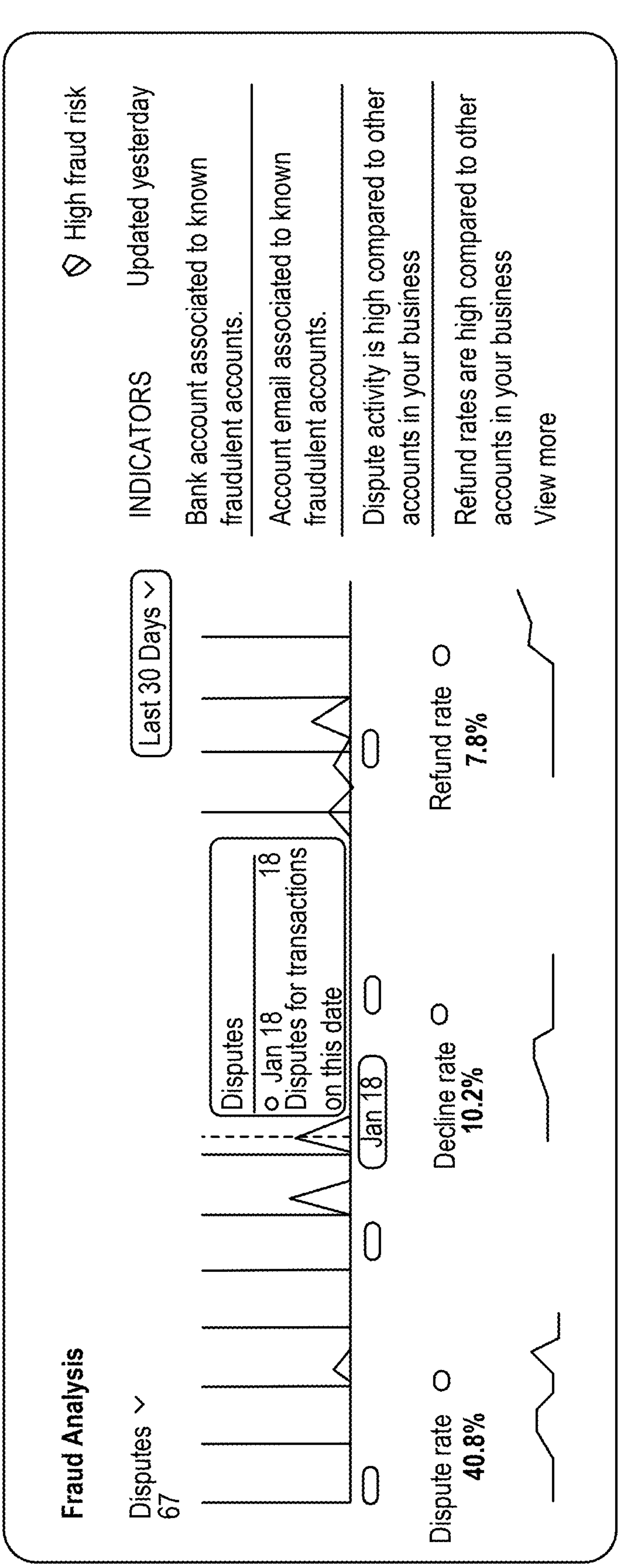
FIG. 5B depicts a screenshot of a user interface for presenting fraud analysis and a set of indicators based on likelihoods of fraud for a given computing system, in accordance with an illustrative embodiment.

FIG. 5B depicts a screenshot of a user interface 505 for presenting fraud analysis and a set of indicators based on likelihoods of fraud for a given computing system. The user interface 505 may be accessed through the user interface 500, for example, by the system administrator to further investigate the potential fraud posed by "John Smith." The user interface 505 may present analytics related to the fraudulence evaluation, such as a number of disputes over a time window (e.g., past 30 days), a dispute rate, a decline rate, a refund rate, as well as one or more indicator codes. The indicator codes may include messages with potential causes for the detection of fraud.

Figure 5C:
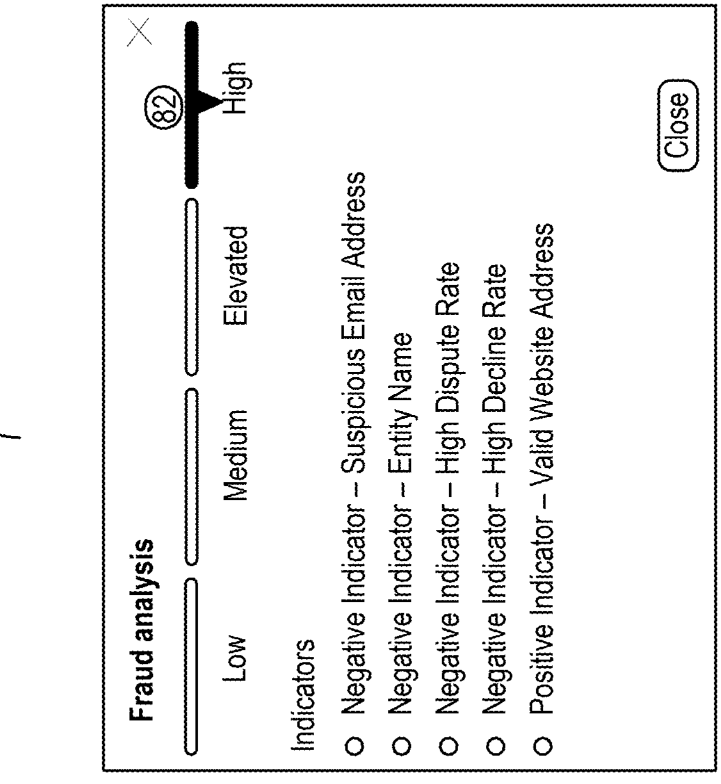
FIG. 5C depicts a screenshot of a user interface for providing fraud analysis summaries for a given computing system, in accordance with an illustrative embodiment.
Figure 5D:
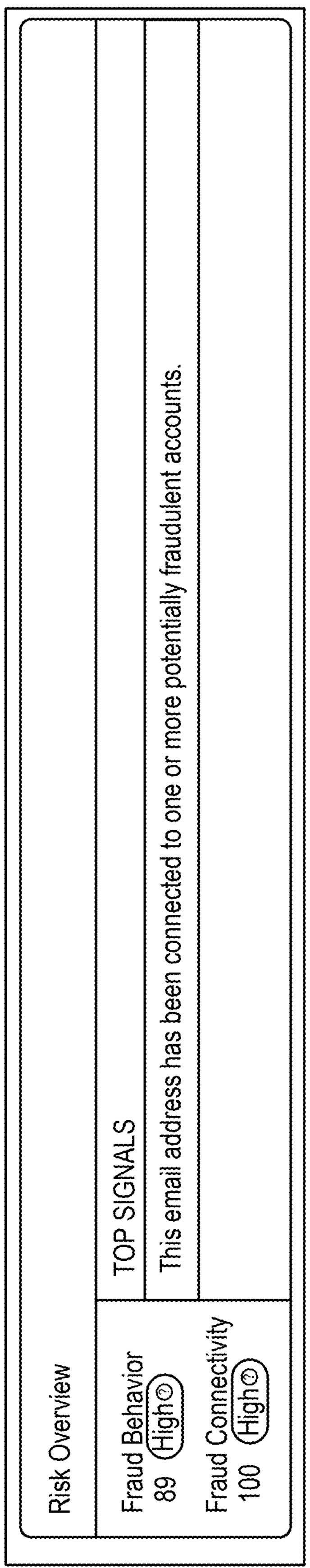
FIG. 5D depicts a screenshot of a user interface for providing causes of fraud for a given computing system, in accordance with an illustrative embodiment.

FIG. 5C depicts a screenshot of a user interface 510 for providing fraud analysis summaries for a given computing system. The user interface 510 may be accessed through the user interface 500 or 505, for example, by the system administrator to further investigate the potential fraud. The user interface 510 may display a classification of the computing system entity as well as indicator codes. In the illustrated example, the user interface 515 may include a set of potential indicators for the classification of the computing system entity, including a low risk, medium risk, elevated risk, and high risk. Each classification may correspond to a range of fraud scores. For example, low risk may correspond to a score ranging between 0 and 30; medium risk may correspond to a score ranging between 30 and 60; elevated risk may correspond to a score between 60 and 80, and high risk may correspond to a score between 80 and 100. As depicted, the computing system entity may be classified as high-risk with a score of 82, as a result of being associated with negative indicators such as a suspicious email address and entity name as well as high dispute and decline rates. The user interface 510 may also display a positive indicator such as a valid website address. FIG. 5D depicts a screenshot of a user interface 515 for providing causes of fraud for a given computing system. The user interface 515 may be accessed through the user interface 500, 505, or 510, for example, by the system administrator to further investigate the potential fraud. The user interface 515 may provide a risk overview for the computing system entity identified as potentially fraudulent, as well as one of the top fraud indicators (e.g., email address) that lead to the detection. The user interface 520 may be used to display scores leading to the classification of the computing system as fraudulent, such as fraudulent behavior or connectivity.

Figure 6:
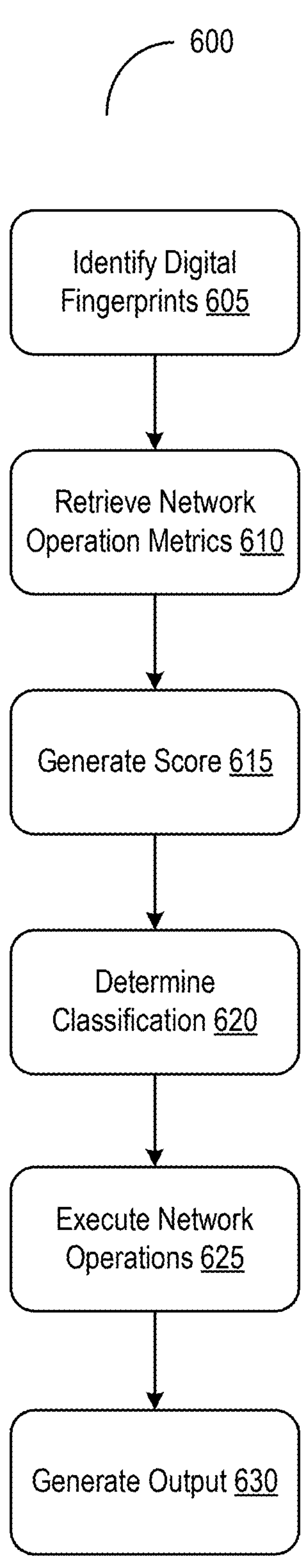
FIG. 6 depicts a flow diagram of a method of evaluating and controlling network operations associated with computing systems in network environments, in accordance with an illustrative embodiment.

FIG. 6 depicts a flow diagram of a method 600 of evaluating and controlling network operations associated with computing systems in network environments. Embodiments may include additional, fewer, or different operations from those described in the method 600. The method 600 may be performed by a server executing machine-readable software code, though it should be appreciated that the various operations may be performed by one or more computing devices and/or processors. At step 605, a server may identify a set of digital fingerprints of the identity of a computing system. The computing system may be associated with an entity communicating requests for network operations to the server on behalf of user devices. The digital fingerprints may include, for example, an account identifier associated with the computing system, an identifier corresponding to the entity associated with the computing system, contact information, location information, an electronic mail address, or a web address, among others.

At step 610, the server may retrieve a set of network operation metrics for the computing system. The set of network operation metrics may identify any number of metrics characterizing previous communications and network operations performed at the server in response to prior requests from the computing system. The network operations may include, for example, a number or rate of disputes (e.g., challenge of a previous transaction request), a number or rate of reversals (e.g., refund requests), a number or rate of denials (e.g., requests determined to be rejected), a number or rate of requests, a number or rate of anomalies, among others. In some embodiments, the server may identify a set of risk factors about the computing system from an instrumentation service.

At step 615, the server may generate a score to indicate a likelihood of fraudulence caused by the computing system. To generate, the server may execute a machine learning model using one or more of the digital fingerprints, the network operation metrics, and the risk factors, among others. The machine learning model may have been trained using labeled training data. The server may input one or more of the digital fingerprints, the network operation metrics, and the risk factors into the machine learning model. Upon input, the server may process the input in accordance with a set of weights of the machine learning. From processing, the server may generate the score to indicate a likelihood of fraudulence. In some embodiments, the server may also generate a set of constituent scores for each of the input data points. At step 620, the server may determine a classification from a set of classifications for the computing system based on the score indicating the likelihood of fraudulence. Each classification may be associated with a range of values for the score. To determine, the server may select the classification with the range of values including the generated score.

At step 625, the server may execute one or more network operations based on the score indicating the likelihood of fraudulence. In some embodiments, the server may compare the score with a threshold. If the score does not exceed the threshold, the server may execute the network operation without any modification (e.g., as originally defined in an electronic request from the computing system. On the other hand, if the score exceeds the threshold, the server may execute another network operation to control communications from the computing system, instead of the originally defined network operation. The server may restrict or control subsequent electronic requests from the computing system. In some embodiments, the server may select the one or more network operations to perform based on the classification.

At step 630, the server may generate an output for presentation on a user interface. The output may include analytics and information related to the computing system. The server may generate the output based on the association of the computing system with any one or more the following: the score, the classification, the digital fingerprints, the network operation metrics, or the risk factors, among others. The server may generate the output to include one or more indicator codes. Each indicator code may include a defined set of alphanumeric characters (e.g., in human-readable or interpretable messages) to indicate the potential cause for the fraudulence. The output from the server may be presented via a set of user interfaces on the user interfaces.

Figure 7:
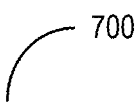
FIG. 7 depicts a flow diagram of a method of training machine learning models to determine likelihoods of fraud, in accordance with an illustrative embodiment.
Figure 7:
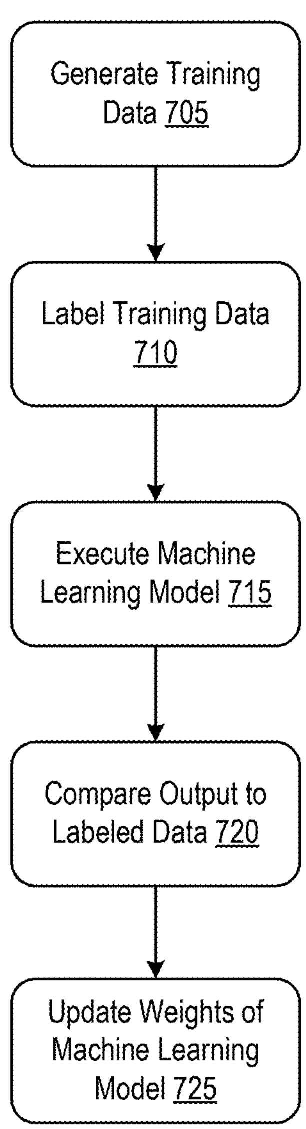

FIG. 7 depicts a flow diagram of a method 700 of training machine learning models to determine likelihoods of fraud. The method 700 may be performed by a server executing machine-readable software code, though it should be appreciated that the various operations may be performed by one or more computing devices and/or processors. Embodiments may include additional, fewer, or different operations from those described in the method 700. The method 700 may be performed by a server executing machine-readable software code, though it should be appreciated that the various operations may be performed by one or more computing devices and/or processors.

At step 705, a server may generate training data for training a machine learning model. The training data may be generated by the server to include one or more of: digital fingerprints, network operation metrics, or risk factors, among others. The digital fingerprints may include any information associated with an identity of a sample computing system. The network operation metrics may include any metrics characterizing previous communications and network operations performed in response to electronic requests from the sample computing system. The risk factors may include information to be used to assess the risk of the sample computing system in terms of fraudulence.

At step 710, the server may label the training data to indicate whether fraudulence is caused by the sample computing system for the input. The label may be derived from previous indications of fraudulence. The label may indicate a presence or absence of fraudulence for the sample computing system, in view of the associated input including one or more of: digital fingerprints, network operation metrics, or risk factors, among others. The server may repeat the inclusion of digital fingerprints, network operation metrics, risk factors, and labels, as a set of examples into the training data.

At step 715, the server may execute the machine learning model, using a set of digital fingerprints, network operation metrics, or risk factors of an example from the training data, to generate a score indicating likelihood of fraudulence caused by the computing system. In executing, the server may input the digital fingerprints, network operation metrics, or risk factors in the machine learning model. The server may process the input in accordance with the set of weights of the machine learning models. From processing, the server may generate the score indicate the likelihood of fraudulence caused by the sample computing system.

At step 720, the server may compare the output score with the labeled training data to determine an error metric according to a loss function. The loss function may include, for example, a norm loss (e.g., L1 or L2), mean absolute error (MAE), mean squared error (MSE), a quadratic loss, a cross-entropy loss, and a Huber loss, among others. The error metric may indicate a degree of deviation between the output of the machine learning model and the label in the training data for the example. In some embodiments, the server may compare a classification determined from the likelihood with the label to determine the error metric. The classification may be determined based on a comparison between the likelihood with ranges for candidate classifications.

At step 725, the server may update weights of the machine learning model using the error metric. The updating of weights of machine learning model may be in accordance with an optimization function, such as an adaptive moment estimation (Adam), implicit update (ISGD), and adaptive gradient algorithm (AdaGrad), among others. The server may iteratively update the weights using the examples of the training data. The server may complete training upon the machine learning reaching a convergence condition.

Figure 8:
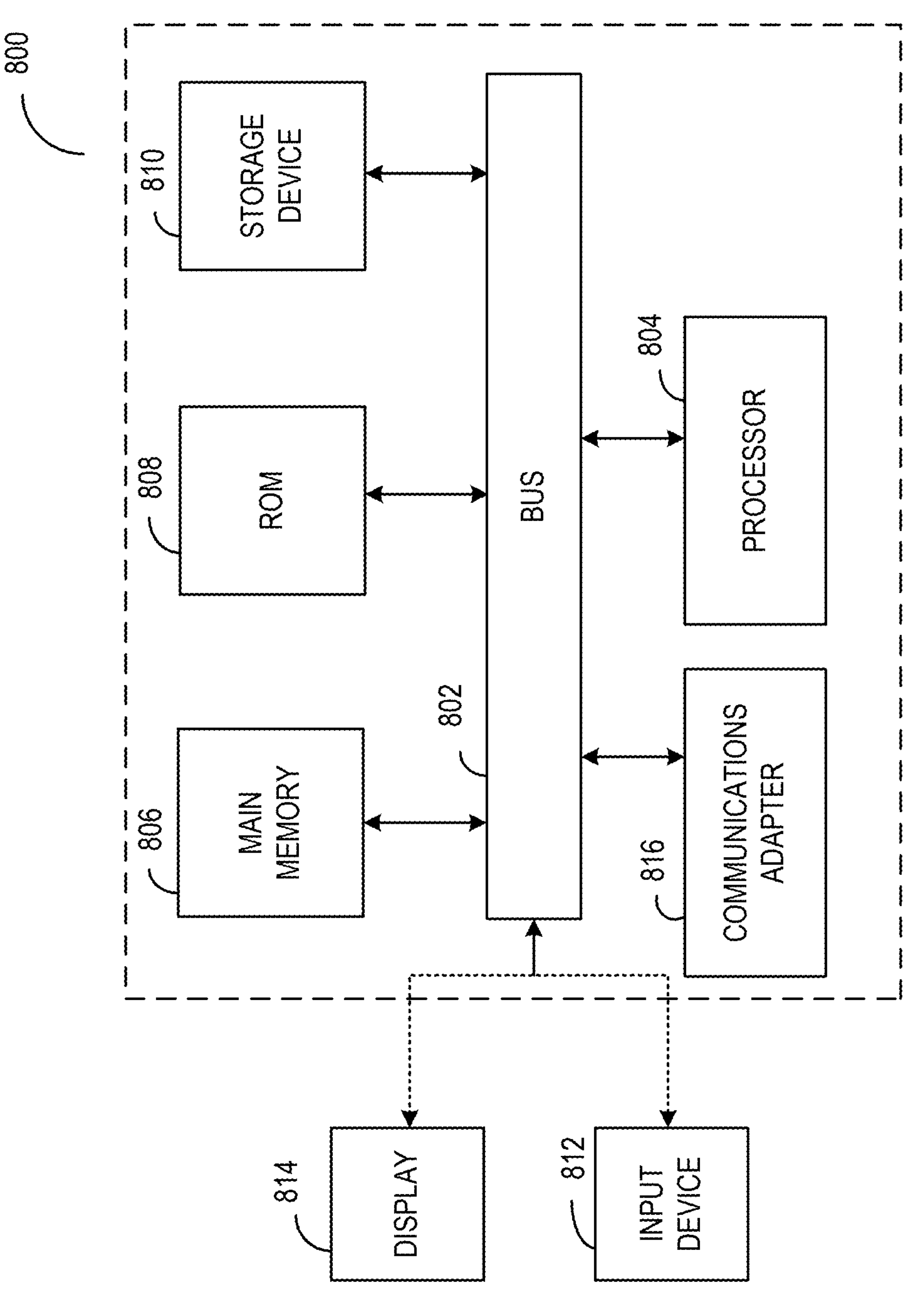
FIG. 8 illustrates a component diagram of an example computing system suitable for use in the various implementations described herein, in accordance with an embodiment.

FIG. 8 is a component diagram of an example computing system suitable for use in the various implementations described herein, according to an example implementation. One or more steps of the methods and processes discussed herein can be performed by the computing system depicted in FIG. 8. The computing system 800 includes a bus 802 or other communication component for communicating information and a processor 804 coupled to the bus 802 for processing information. The computing system 800 also includes main memory 806, such as a RAM or other dynamic storage device, coupled to the bus 802 for storing information, and instructions to be executed by the processor 804. Main memory 806 can also be used for storing position information, temporary variables, or other intermediate information during the execution of instructions by the processor 804. The computing system 800 may further include a ROM 708 or other static storage device coupled to the bus 702 for storing static information and instructions for the processor 804. A storage device 810, such as a solid-state device, magnetic disk, or optical disk, is coupled to the bus 802 for persistently storing information and instructions.

The computing system 800 may be coupled via the bus 802 to a display 714, such as a liquid crystal display, or active-matrix display, for displaying information to a user. An input device 812, such as a keyboard including alphanumeric and other keys, may be coupled to the bus 802 for communicating information, and command selections to the processor 804. In another implementation, the input device 812 has a touchscreen display. The input device 812 can include any type of biometric sensor, or a cursor control, such as a mouse, a trackball, or cursor direction keys, for communicating direction information and command selections to the processor 804 and for controlling cursor movement on the display 814.

In some implementations, the computing system 700 may include a communications adapter 816, such as a networking adapter. Communications adapter 716 may be coupled to bus 802 and may be configured to enable communications with a computing or communications network or other computing systems. In various illustrative implementations, any type of networking configuration may be achieved using communications adapter 716, such as wired (e.g., via Ethernet), wireless (e.g., via Wi-Fi, Bluetooth), satellite (e.g., via GPS) pre-configured, ad-hoc, LAN, WAN, and the like.

According to various implementations, the processes of the illustrative implementations that are described herein can be achieved by the computing system 800 in response to the processor 804 executing an implementation of instructions contained in main memory 806. Such instructions can be read into main memory 806 from another computer-readable medium, such as the storage device 810. Execution of the implementation of instructions contained in main memory 806 causes the computing system 800 to perform the illustrative processes described herein. One or more processors in a multi-processing implementation may also be employed to execute the instructions contained in the main memory 806. In alternative implementations, hard-wired circuitry may be used in place of or in combination with software instructions to implement illustrative implementations. Thus, implementations are not limited to any specific combination of hardware circuitry and software.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means, including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

The invention claimed is:

1. A method of evaluating network operations associated with computing systems, the method comprising:

receiving, by a server from a computing system of a plurality of computing systems, an electronic request to execute a first network operation using a plurality of attributes provided by an end user device of a plurality of end user devices to the computing system, the first network operation initiated via the end user device;

retrieving, by the server, (i) a digital fingerprint associated with an identity of the computing system and (ii) a plurality of network operation metrics for one or more network operations that are associated with the computing system and initiated by one or more of the plurality of end user devices;

executing, by the server, using the digital fingerprint and the plurality of network operation metrics, a machine learning (ML) model to generate a score corresponding to a likelihood of fraud associated with the computing system; and based on the score satisfying a threshold:

selecting, by the server, from a plurality of candidate network operations, a second network operation for the electronic request in accordance with the score;

executing, by the server, the second network operation, using at least a portion of the plurality of attributes provided by the end user device, instead of executing the first network operation initiated by the end user device; and generating, by the server, a data record to add to a subsequent electronic request from the computing system to indicate a requisition for inspection.

2. The method of claim 1, further comprising determining, by the server, from a plurality of classifications, a classification of the computing system in accordance with the score corresponding to the likelihood of fraud, and wherein executing the second network operation further comprises selecting, from a plurality of network operations, the second network operation based on the classification of the computing system.

3. The method of claim 2, wherein the plurality of network operations further comprises at least one of: (i) a rejection of the subsequent electronic request, (ii) a routing of the subsequent electronic request for inspection, or (iii) a generation of an alert to indicate the computing system as cause of fraudulence.

4. The method of claim 1, further comprising:

generating, by the server, an output, using an association between the computing system and at least one of: (i) the digital fingerprint, (ii) the plurality of network operation metrics, or (iii) the score corresponding to the likelihood of fraud associated with the computing system; and transmitting, by the server, the output for presentation via a user interface having a plurality of user interface elements.

5. The method of claim 4, further comprising selecting, by the server, a template from a plurality of templates based on the score corresponding to the likelihood of fraud, each of the plurality of templates defining generation of codes to characterize the computing system; and wherein generating the output further comprises generating the output in accordance with the template.

6. The method of claim 1, further comprising executing, by the server, using a second digital fingerprint and a second plurality of network operation metrics associated with a second computing system of the plurality of computing systems, the ML model to generate a second score corresponding to a second likelihood of fraud associated with the second computing system; and based on the second score not satisfying a threshold, executing, by the server, a third network operation using a second plurality of attributes in accordance with a second electronic request from the second computing system.

7. The method of claim 1, wherein executing the machine learning model to generate the score corresponding to the likelihood of fraud further comprises generating a plurality of constituent scores corresponding to a plurality of fraud indicators for the computing system.

8. A system for evaluating network operations associated with computing systems, the system comprising:

a server having one or more processors coupled with memory, wherein the server is configured to:

receive, from a computing system of a plurality of computing systems, an electronic request to execute a first network operation using a plurality of attributes provided by an end user device of a plurality of end user devices to the computing system, the first network operation initiated via the end user device;

retrieve (i) a digital fingerprint associated with an identity of the computing system and (ii) a plurality of network operation metrics for one or more network operations that are associated with the computing system and initiated by one or more of the plurality of end user devices;

execute, using the digital fingerprint and the plurality of network operation metrics, a machine learning (ML) model to generate a score corresponding to a likelihood of fraud associated with the computing system;

based on the score in response to satisfying a threshold:

select, from a plurality of candidate network operations, a second network operation for the electronic request in accordance with the score;

execute the second network operation using at least a portion of the plurality of attributes provided by the end user device, instead of executing the first network operation initiated by the end user device; and generate a data record to add to a subsequent electronic request from the computing system to indicate a requisition for inspection.

9. The system of claim 8, wherein the server is further configured to determine, from a plurality of classifications, a classification of the computing system in accordance with the score, and select, from a plurality of network operations, the second network operation based on the classification of the computing system.

10. The system of claim 9, wherein the plurality of network operations further comprises at least one of: (i) a rejection of the subsequent electronic request, (ii) a routing of the subsequent electronic request for inspection, or (iii) a generation of an alert to indicate the computing system as cause of fraudulence.

11. The system of claim 8, wherein the server is further configured to:

generate an output, using an association between the computing system and at least one of: (i) the digital fingerprint, (ii) the plurality of network operation metrics, or (iii) the score corresponding to the likelihood of fraud associated with the computing system; and transmit the output for presentation via a user interface having a plurality of user interface elements.

12. The system of claim 11, wherein the server is further configured to:

select a template from a plurality of templates based on the score corresponding to the likelihood of fraud, each of the plurality of templates defining generation of codes to characterize the computing system; and generate the output in accordance with the template.

13. The system of claim 8, wherein the server is further configured to:

receive a plurality of risk factors associated with the computing system from an instrumentation service, and execute the ML model using the plurality of risk factors from the instrumentation service.

14. The system of claim 8, wherein the server is further configured to:

execute, using a second digital fingerprint and a second plurality of network operation metrics associated with a second computing system of the plurality of computing systems, the ML model to generate a second score corresponding to a second likelihood of fraud associated with the second computing system; and based on the second score not satisfying a threshold, execute a third network operation using a second plurality of attributes in accordance with a second electronic request from the second computing system.

15. The system of claim 8, wherein the server is further configured to generate a plurality of constituent scores corresponding to a plurality of fraud indicators for the computing system.

16. A non-transitory computer readable medium storing instructions, which when executed by at least one processor, cause the at least one processor to:

receive, from a computing system of a plurality of computing systems, an electronic request to execute a first network operation using a plurality of attributes provided by an end user device of a plurality of end user devices to the computing system, the first network operation initiated via the end user device;

retrieve (i) a digital fingerprint associated with an identity of the computing system and (ii) a plurality of network operation metrics for one or more network operations that are associated with the computing system and initiated by one or more of the plurality of end user devices;

execute, using the digital fingerprint and the plurality of network operation metrics, a machine learning (ML) model to generate a score corresponding to a likelihood of fraud associated with the computing system;

based on the score satisfying a threshold:

select, from a plurality of candidate network operations, a second network operation for the electronic request in accordance with the score;

execute the second network operation using at least a portion of the plurality of attributes provided by the end user device, instead of executing the first network operation initiated by the end user device; and generate a data record to add to a subsequent electronic request from the computing system to indicate a requisition for inspection.

17. The non-transitory computer readable medium of claim 16, wherein the instructions further cause the at least one processor to:

determine, from a plurality of classifications, a classification of the computing system in accordance with the score corresponding to the likelihood of fraud, and select, from a plurality of network operations, the second network operation based on the classification of the computing system.

18. The non-transitory computer readable medium of claim 16, wherein the instructions further cause the at least one processor to:

generate an output, using an association between the computing system and at least one of: (i) the digital fingerprint, (ii) the plurality of network operation metrics, or (iii) the score corresponding to the likelihood of fraud associated with the computing system; and transmit the output for presentation via a user interface having a plurality of user interface elements.

19. The non-transitory computer readable medium of claim 18, wherein the instructions further cause the at least one processor to:

select a template from a plurality of templates based on the score corresponding to the likelihood of fraud, each of the plurality of templates defining generation of codes to characterize the computing system; and generate the output in accordance with the template.

20. The non-transitory computer readable medium of claim 16, wherein the instructions further cause the at least one processor to:

receive a plurality of risk factors associated with the computing system from an instrumentation service, and execute the ML model using the plurality of risk factors from the instrumentation service.

* * * * *